US009255311B2

(12) United States Patent
Kuroda et al.

(10) Patent No.: US 9,255,311 B2
(45) Date of Patent: Feb. 9, 2016

(54) COPPER ALLOY CONDUCTOR, AND TROLLEY WIRE AND CABLE USING SAME, AND COPPER ALLOY CONDUCTOR FABRICATION METHOD

(75) Inventors: Hiromitsu Kuroda, Hitachi (JP); Kazuma Kuroki, Hitachinaka (JP); Seigi Aoyama, Kitaibaraki (JP); Hiroyoshi Hiruta, Kitaibaraki (JP)

(73) Assignee: Hitachi Metals, Ltd., Tokyo (JP)

( * ) Notice: Subject to any disclaimer, the term of this patent is extended or adjusted under 35 U.S.C. 154(b) by 1864 days.

(21) Appl. No.: 11/328,072

(22) Filed: Jan. 10, 2006

(65) Prior Publication Data

US 2006/0157167 A1 Jul. 20, 2006

(30) Foreign Application Priority Data

Jan. 17, 2005 (JP) ................................ 2005-009025

(51) Int. Cl.

| | |
|---|---|
| ***C22C 9/02*** | (2006.01) |
| ***C22F 1/08*** | (2006.01) |
| ***B60M 1/13*** | (2006.01) |
| ***H01B 1/02*** | (2006.01) |

(52) U.S. Cl.

CPC ... *C22C 9/02* (2013.01); *C22F 1/08* (2013.01); *H01B 1/026* (2013.01)

(58) Field of Classification Search

USPC .................................................. 148/433, 554

IPC ................. C22C 9/02; C22F 1/08; H01B 1/026

See application file for complete search history.

(56) References Cited

U.S. PATENT DOCUMENTS

| | | | | |
|---|---|---|---|---|
| 3,649,254 | A * | 3/1972 | Servi | 420/470 |
| 4,822,560 | A | 4/1989 | Oyama et al. | |

FOREIGN PATENT DOCUMENTS

| | | | |
|---|---|---|---|
| JP | 03024241 | * | 2/1991 |
| JP | 04180531 | * | 6/1992 |
| JP | 6-240426 | | 8/1994 |
| JP | 10102165 | * | 4/1998 |
| JP | 2001316741 | * | 11/2001 |
| JP | 2002025353 | * | 1/2002 |
| JP | 2003-268467 | | 9/2003 |
| JP | 2004-179151 | | 6/2004 |
| JP | 2005-133111 | | 5/2005 |

* cited by examiner

*Primary Examiner* — Sikyin Ip

(74) *Attorney, Agent, or Firm* — McGinn IP Law Group, PLLC

(57) ABSTRACT

A copper alloy conductor has a copper alloy material which has a copper parent material with 0.001 to 0.1 wt % (=10 to 1000 wt·ppm) of oxygen and 0.15 to 0.70 wt % (exclusive of 0.15 wt %) of Sn. A crystalline grain to form a crystalline structure of the copper alloy material has an average diameter of 100 μm or less, and 80% or more of an oxide of the Sn is dispersed in a matrix of the crystalline structure as a fine oxide grain with an average diameter of 1 μm or less.

9 Claims, 1 Drawing Sheet

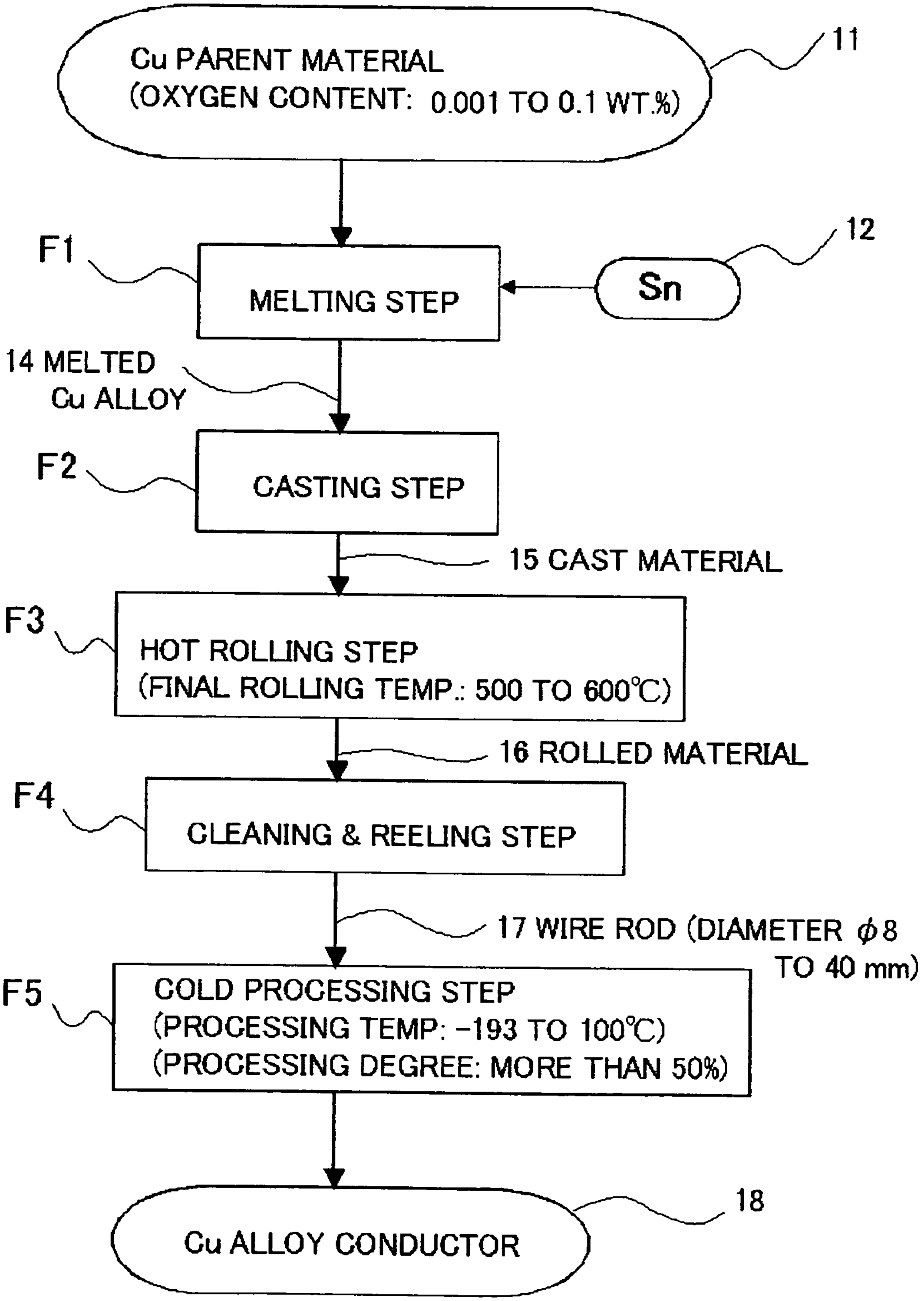
Cu PARENT MATERIAL
(OXYGEN CONTENT: 0.001 TO 0.1 WT.%)
11
F1
MELTING STEP
Sn
12
14 MELTED Cu ALLOY
F2
CASTING STEP
15 CAST MATERIAL
F3
HOT ROLLING STEP
(FINAL ROLLING TEMP.: 500 TO 600℃)
16 ROLLED MATERIAL
F4
CLEANING & REELING STEP
17 WIRE ROD (DIAMETER φ8 TO 40 mm)
F5
COLD PROCESSING STEP
(PROCESSING TEMP: −193 TO 100℃)
(PROCESSING DEGREE: MORE THAN 50%)
Cu ALLOY CONDUCTOR
18

COPPER ALLOY CONDUCTOR, AND TROLLEY WIRE AND CABLE USING SAME, AND COPPER ALLOY CONDUCTOR FABRICATION METHOD

The present application is based on Japanese patent application No. 2005-009025, the entire contents of which are incorporated herein by reference.

BACKGROUND OF THE INVENTION

1. Field of the Invention

The present invention relates to a copper alloy conductor (a trolley wire) for electric train lines, which is formed of a high-conductivity and high-strength copper alloy material and which supplies power to electric trains via pantographs, etc., a cable conductor for equipment used in cables for equipment of each kind, and an industrial cable conductor used for general industrial cables (heat-resistant electric wires, cables for robots, cab tire cables).

2. Description of the Related Art

In copper alloy conductors (trolley wires) for electric train lines, or in cable conductors for equipment used in cables for equipment of each kind, there are used high-conductivity hard copper wires, or abrasion-resistant and heat-resistant copper alloy materials (copper alloy wires). Copper alloy materials are known that contain 0.25 to 0.35 wt % of Sn in copper parent materials (See JP-A-57-140234), and they are used as trolley wires for Shinkansen lines (or bullet train) and conventional railway lines, and cable conductors for equipment.

In recent years, there has been progress in higher-speed trains. Increasing the train speed requires enhancement in the tension of overhead wires, so that the tension of overhead wires in train lines tends to be increased from 1.5 t to 2.0 t or higher. Also, in train lines with high passing train density (the number of passing trains per unit line length), there is a demand for larger current capacity of trolley wires.

Also, in cable conductors for equipment, taking account of use environments, there is a demand for better bend-resistant, i.e., higher-strength conductors. In cable conductors for equipment, to meet needs for lighter weight and smaller size, there is also a demand for higher conductivity.

Further, in industrial cable conductors, there is also a demand for conductors that inhibit reductions in conductivity as much as possible, enhance strength and heat resistance, and has good bend resistance, taking account of use environments.

Accordingly, as conductors that meet these demands, high-strength and high-conductivity copper alloy conductors are needed.

As high-strength copper alloy conductors, there are mainly 2 kinds: solid solution-strengthening alloys and precipitation-strengthening alloys. As solid solution-strengthening alloys, there are Cu—Ag alloys (high-concentration silver), Cu—Sn alloys, Cu—Sn—In alloys, Cu—Mg alloys, Cu—Sn—Mg alloys, etc. Also, as precipitation-strengthening alloys, there are Cu—Zr alloys, Cu—Cr alloys, Cu—Cr—Zr alloys, etc.

Any of solid solution-strengthening alloys has an oxygen content of 10 wt·ppm (=0.001 wt %) or less, and are excellent in strength and elongation properties, which allows copper alloy wire rods that serve as parent materials of trolley wires to be made directly from melted copper alloys by continuous casting and rolling.

As a fabrication method of conventional trolley wires using solid solution-strengthening alloys, a copper-alloy cast material containing 0.4 to 0.7 wt % of Sn, for example, is hot-rolled at temperatures of 700° C. or more. This rolled material is again heated at temperatures of 500° C. or less, followed by finishing rolling to form a wire rod, from which the wire is drawn to make a trolley wire (See JP-A-6-240426).

Also, as other copper alloys that can be continuously cast and rolled, there are Cu—O—Sn alloys. It is known that these Cu—O—Sn alloys have a crystallized substance ($SnO_2$) with Sn of a 2-3 μm size or more present inside a matrix, and that their strength and elongation properties are equal to those of Cu—Sn alloys, the oxygen content of which is 10 wt·ppm or less. These alloys also have the stronger solid solution-strengthening effect than the precipitation-strengthening effect and dispersion-strengthening effect.

In solid solution-strengthening alloys, the enhancement of strength can be ensured by increasing its solid solution-strengthening element content. However, because it substantially reduces conductivity, electric current capacity cannot be large, which would result in no suitable electric train lines. For instance, a fabrication method described in JP-A-6-240426 results in a low conductivity because the Sn content is as large as 0.4 to 0.7 wt %. Thus, in conventional Cu—Sn-based alloys, there is difficulty in making copper alloy conductors that have strength required for high-tension overhead wires, and good conductivity.

Here, to obtain high-strength and high-tension electric train lines, another element together with Sn is considered to be further added. In this case, there is the problem that too low finishing rolling (final rolling) temperatures would cause many cracks in a rolled material during rolling, so that the quality of wire rod appearance and electric train line strength would degrade substantially.

On the other hand, although precipitation-strengthening alloys have very high hardness and tensile strength, high hardness would cause an excessive load to mill rolls during continuous casting and rolling, which would make fabrication by the continuous casting and rolling impossible. For this reason, precipitation-strengthening alloys can be produced only by batch methods such as extrusion, etc. In addition, precipitation-strengthening alloys require thermal treatment for precipitation of precipitatibn-strengthening substances in an intermediate step. Thus there is the problem that precipitation-strengthening alloys are low in productivity and high in manufacturing cost, compared with solid solution-strengthening alloys that can be made by continuous casting and rolling.

That is, there are constraints and limits in manufacturing high-strength and high-conductivity copper alloy conductors using a continuous casting and rolling method that is excellent in productivity.

SUMMARY OF THE INVENTION

Accordingly, it is an object of the present invention to provide a high-strength and high-conductivity copper alloy conductor, a trolley wire and cable using the copper alloy conductor, and a copper alloy conductor fabrication method.

(1) In accordance with one aspect of the invention, a copper alloy conductor comprises:

a copper alloy material that comprises: a copper parent material comprising 0.001 to 0.1 wt % (=10 to 1000 wt·ppm) of oxygen; and 0.15 to 0.70 wt % (exclusive of 0.15 wt %) of Sn, wherein a crystalline grain to form a crystalline structure of the copper alloy material has an average diameter of 100 μm or less, and 80% or more of an oxide of the Sn is dispersed in a matrix of the crystalline structure as a fine oxide grain with an average diameter of 1 μm or less.

(2) In accordance with another aspect of the invention, a copper alloy conductor comprises:

a copper alloy material that comprises: a copper parent material comprising 0.001 to 0.1 wt % (=10 to 1000 wt·ppm) of oxygen; and 0.05 to 0.15 wt % of Sn, wherein a crystalline grain to form a crystalline structure of the copper alloy material has an average diameter of 100 μm or less, and 80% or more of an oxide of the Sn is dispersed in a matrix of the crystalline structure as a fine oxide grain with an average diameter of 1 μm or less.

In the above inventions (1) and (2), the following modifications and changes can be made.

(i) P or B in addition to the Sn may be contained at a ratio of 0.01 wt % (=100 wt·ppm) or less.

(ii) P and B in addition to the Sn may be contained at a total ratio of 0.02 wt % (=200 wt·ppm) or less.

(iii) The tensile strength may be 420 MPa or more, and that the conductivity may be 60% IACS or more.

(iv) The tensile strength may be 420 MPa or more, and the conductivity may be 75 to less than 94% IACS.

(v) The tensile strength may be 200 to less than 420 MPa, and the conductivity may be 94% IACS or more.

(3) In accordance with another aspect of the invention, a trolley wire comprises:

a copper alloy conductor that comprises a copper alloy material that comprises: a copper parent material comprising 0.001 to 0.1 wt % (=10 to 1000 wt·ppm) of oxygen; and 0.15 to 0.70 wt % (exclusive of 0.15 wt %) of Sn, wherein a crystalline grain to form a crystalline structure of the copper alloy material has an average diameter of 100 μm or less, and 80% or more of an oxide of the Sn is dispersed in a matrix of the crystalline structure as a fine oxide grain with an average diameter of 1 μm or less.

(4) In accordance with another aspect of the invention, a cable comprises:

a single wire rod or a stranded wire material around which is provided an insulating layer wherein the single wire rod or the stranded wire material comprising a copper alloy conductor that comprises a copper alloy material that comprises: a copper parent material comprising 0.001 to 0.1 wt % (=10 to 1000 wt·ppm) of oxygen; and 0.05 to 0.15 wt % of Sn, wherein a crystalline grain to form a crystalline structure of the copper alloy material has an average diameter of 100 μm or less, and 80% or more of an oxide of the Sn is dispersed in a matrix of the crystalline structure as a fine oxide grain with an average diameter of 1 μm or less.

(5) In accordance with another aspect of the invention, a method of fabricating a copper alloy conductor using a rolled material comprises the steps of:

adding 0.15 to 0.70 wt % (exclusive of 0.15 wt %) of Sn to a 0.001 to 0.1 wt % (=10 to 1000 wt·ppm) oxygen-containing copper parent material and melting the Sn-added copper parent material, to form a melted copper alloy;

continuously casting the melted copper alloy, and rapidly cooling the cast material up to a lower temperature than the melting point of the melted copper alloy by at least 15° C. or more; and multistage-hot-rolling the cast material with its temperature adjusted to be 900° C. or less so that the final rolling temperature is adjusted to be 500 to 600° C., to form the rolled material.

(6) In accordance with another aspect of the invention, a method of fabricating a copper alloy conductor using a rolled material comprises the steps of:

adding 0.05 to 0.15 wt % of Sn to a 0.001 to 0.1 wt % (=10 to 1000 wt·ppm) oxygen-containing copper parent material and melting the Sn-added copper parent material, to form a melted copper alloy;

continuously casting the melted copper alloy, and rapidly cooling the cast material up to a lower temperature than the melting point of the melted copper alloy by at least 15° C. or more; and multistage-hot-rolling the cast material with its temperature adjusted to be 900° C. or less so that the final rolling temperature is adjusted to be 500 to 600° C., to form the rolled material.

In the above inventions (5) and (6), the following modifications and changes can be made.

(vi) The rolled material is cold-processed with a degree of processing of 50% or more, at a temperature of −193 to 100° C., to form a copper alloy conductor.

<Advantages of the Invention>

According to the present invention, it is possible to provide a high-strength and high-conductivity copper alloy conductor with good productivity.

BRIEF DESCRIPTION OF THE DRAWINGS

The preferred embodiments according to the invention will be explained below referring to the drawings, wherein:

FIG. 1 is a flow chart showing the fabrication process for a copper alloy conductor according to a preferred embodiment of the invention.

DETAILED DESCRIPTION OF THE PREFERRED EMBODIMENTS

A copper alloy conductor according to a preferred embodiment of the invention comprises a copper alloy material containing 0.15 to 0.70 wt % (exclusive of 0.15 wt %) of Sn in a copper parent material containing 0.001 to 0.1 wt % (=10 to 1000 wt·ppm) of oxygen. This copper alloy conductor comprises crystalline grains whose average diameter is 100 μm or less, which make up crystalline structure, and a Sn oxide, 80% or more of which is dispersed as fine oxide grains with an average diameter of 1 μm or less, in a matrix of the crystalline structure, wherein the tensile strength is 420 MPa or more, preferably 420 to 460 MPa, and the conductivity is 60% IACS or more, preferably 60 to less than 94% IACS, more preferably 75 to less than 94% IACS.

For the oxygen content of the copper parent material being in the range of 0.001 to 0.1 wt % (=10 to 1000 wt·ppm), the tensile strength and conductivity are both increased by increasing the oxygen content.

FIG. 1 is a flow chart showing the fabrication process for a copper alloy conductor according to a preferred embodiment of the invention.

As shown in FIG. 1, the method of fabricating a copper alloy conductor 18 according to the present invention comprises the steps of: adding Sn 12 to a copper parent material 11 and melting the Sn 12-added copper parent material 11, to form a melted copper alloy 14 (F1); casting the melted copper alloy 14 to form a cast material 15 (F2); multistage-hot-rolling the cast material 15 to form a rolled material 16 (F3);

cleaning and reeling the rolled material 16 to form a wire rod 17 (F4); and passing and cold-processing (wire-drawing) the reeled wire rod 17 to form a copper alloy conductor 18 (F5).

The copper alloy conductor 18 is then processed into a desired shaped wire rod, strip material (plate material), etc., according to uses. An existing or conventional continuous casting and rolling equipment (an SCR continuous casting machine) may apply in the melting step (F1) to cleaning and reeling step (F4). Also, an existing or conventional cold-processing apparatus may apply in the cold-processing step (F5).

The method of fabricating a copper alloy conductor 18 will be explained in more detail. First, in the melting step (F1), 0.15 to 0.70 wt % (exclusive of 0.15 wt %), preferably 0.20 to 0.70 wt %, more preferably 0.25 to 0.65 wt % of Sn 12 is added to a copper parent material 11 containing 0.001 to 0.1 wt % (=10 to 100 wt·ppm) of oxygen. The Sn12-added copper parent material 11 is melted to form a melted copper alloy 14. Sn 12 is oxidized to form a Sn oxide ($SnO_2$) which is dispersed in the crystalline structure of a copper alloy conductor 18 to be finally obtained. Most (80% or more) of the Sn oxide ($SnO_2$) comprises fine oxide grains with an average diameter of 1 μm or less. The copper parent material 11 may contain inevitable impurities.

Here, in the Sn 12 content being less than 0.15 wt %, even if the fabrication method according to this embodiment is applied, the effect of enhancing the strength of the copper alloy conductor 18 to 420 MPa or more cannot be obtained. Also, in case of the Sn 12 content exceeding 0.70 wt %, as the hardness of the cast material 15 becomes high, and deformation resistance during rolling becomes high, an extremely large load acts on mill rolls, which causes difficulty in manufacturing. Furthermore, in the Sn12 content range of 0.15 to 0.70 wt %, the conductivity gradually decreases with increasing Sn 12 content.

Accordingly, in the present embodiment, by properly adjusting the Sn 12 content in the range of 0.15 to 0.70 wt % (exclusive of 0.15 wt %), it is possible to enhance the tensile strength of the copper alloy conductor 18 to 420 MPa or more, and desirably adjust the conductivity in the range of 60 to less than 94% IACS, preferably 75 to less than 94% IACS, more preferably 80 to less than 94% IACS, as will be described later in Embodiments.

As the Sn 12 content is increased, the rolled material 16 tends to have many surface flaws during hot-rolling in hot-rolling step (F3). Thus, in the case of a large Sn 12 content (0.5 wt % or more, for example), to reduce surface flaws of the rolled material 16, P along with Sn 12 may be added to the copper parent material 11. The P content is 0.01 wt %(=100 wt·ppm) or less. A P content of less than 2 wt·ppm has little effect of reducing copper wire surface flaws, while a P content of exceeding 100 wt. ppm reduces the conductivity of the copper alloy conductor 18.

As the Sn 12 content is also increased, the crystalline grains of the cast material 15 after casting step (F2) tend to be slightly larger (the strength of the copper alloy conductor 18 tends to slightly decrease). Thus, in the case of a large Sn 12 content (0.5 wt % or more, for example), to make the crystalline grains of the cast material 15 fine, B along with Sn 12 may be added to the copper parent material 11. The B content is 0.01 wt % (=100 wt·ppm) or less. A B-content of less than 2 wt·ppm has little effect of making the crystalline grains fine (little effect of enhancing the strength of the copper alloy conductor 18), while a B-content of exceeding 100 wt·ppm reduces the conductivity of the copper alloy conductor 18.

Moreover, the P and B contents both are 0.02 wt % (=200 wt·ppm) or less in total.

Next, in casting step (F2), the melted copper alloy 14 obtained in the previous step is continuously cast and rolled using an SCR method. Specifically, casting is performed at lower temperatures (1100 to 1150° C.) than typical SCR continuous casting temperatures (1120 to 1200° C.), and its mold (copper mold) is forcedly water-cooled. This allows the cast material 15 to be rapidly cooled up to a lower temperature than the solidification temperature of the melted copper alloy 14 by at least 15° C. or more.

These casting and rapid cooling allows the size of an oxide crystallized (or precipitated) in the cast material 15, and the crystalline grain size of the cast material 15 to be small compared with the case where casting is performed at a typical casting temperature, or where the cast material 15 is only cooled up to a temperature that exceeds the solidification temperature, −15° C., of the melted copper alloy 14.

Next, in hot-rolling step (F3), the cast material 15 is multistage-hot-rolled with its temperature adjusted to be lower than a typical hot-rolling temperature in continuous casting and rolling by 50 to 100° C., i.e., 900° C. or less, preferably 750 to 900° C. In final rolling, hot-rolling is applied at a rolling temperature of 500 to 600° C. to form a rolled material 16. A final rolling temperature of less than 500° C. causes many surface flaws during rolling, and degrades surface quality, while that exceeding 600° C. makes crystalline structure as coarse as in the prior art. Here, in the final rolling temperature range of 500 to 600° C., the tensile strength gradually decreases, but the conductivity gradually enhances with increasing final rolling temperature.

This hot-rolling allows the relatively small-size oxide crystallized (or precipitated) in the previous step to be fragmented, further reducing the size of the oxide. Also, since hot rolling in the fabrication method according to this embodiment is performed at a lower temperature than that of typical hot rolling, dislocations introduced during rolling are rearranged to form fine subgrain boundaries in crystalline grains. The subgrain boundaries are intercrystalline boundaries between plural crystals with slightly different orientations that exist in crystalline grains.

Next, in cleaning and reeling step (F4), the rolled material 16 is cleaned and reeled to obtain a wire rod 17. The diameter of the reeled wire rod 17 is 8 to 40 mm, preferably 30 mm or less, for example. For instance, the diameter of the reeled wire rod 17 in a trolley wire is 22 to 30 mm.

Finally, in cold-processing step (F5), the reeled wire rod 17 is passed and cold-processed (wire-drawn) at a temperature of −193° C. (liquid nitrogen temperature) to 100° C., preferably −193° C. to 25° C. or less. This provides a copper alloy conductor 18. Here, to diminish the effect (e.g., a strength decrease) of processing heat during continuous wire-drawing on the copper alloy conductor 18, cold-processing apparatus such as a drawing die is cooled so that the wire rod temperature is adjusted to 100° C. or less, preferably 25° C. or less. Also, to enhance the strength of the copper alloy conductor 18, degree of processing in hot-rolling is required to be increased to enhance sufficiently the strength of the rolled material 16, i.e., the reeled wire rod 17, and besides, degree of processing in cold-processing is required to be 50% or more. Here, a less-than 50% degree of processing cannot provide a tensile strength exceeding 420 MPa.

The copper alloy conductor 18 obtained is then formed into a desired shape, e.g., an electric train line (a trolley wire), a cable conductor for equipment, an industrial cable conductor, etc., according to uses. The cross-section of an electric train line is 110 to 170 $mm^2$, for example.

Next, the effects of the present preferred embodiment will be explained.

Conventional copper alloy conductors have coarse crystalline structure. Also, oxides of Sn, etc. for example, are coarse so that their average grain diameter (or length) exceeds 1 μm. These results show that the conventional copper alloy conductors do not have very sufficient tensile strength.

In contrast, in the copper alloy conductor 18 fabrication method according to the present preferred embodiment, a 0.15 to 0.70 wt % (exclusive of 0.15 wt %) of Sn 12 is added to a copper parent material 11 to form a melted copper alloy 14, which is continuously cast at low tempertures (casting temperature: 1100 to 1150° C.), low-temperature-rolled (final rolling temperature: 500 to 600° C.), and cold-processed at temperatures adjusted to 100° C. or less so as not to be affected by processing heat, to make a copper alloy conductor 18.

This allows the copper alloy conductor 18 according to the present preferred embodiment to have a fine crystalline structure, compared with conventional copper alloy conductors. Specifically, the average grain diameter of the copper alloy conductor 18 is as small as 100 μm or less, compared with the average grain diameter of crystalline grains of conventional copper alloy conductors. Also, a Sn oxide 12 is dispersed in the matrix of the copper alloy conductor 18 and most (80% or more) of the oxide comprises fine oxide grains with an average diameter of 1 μm or less.

This fine oxide dispersed in the matrix inhibits movement of crystals and crystalline grain boundaries due to heat (sensible heat) of the cast material 15. As a result, because growth of each crystalline grain during hot-rolling is inhibited, the rolled material 16 has fine crystalline structure.

From above, the copper alloy conductor 18 according to the present preferred embodiment is strengthened by the copper alloy conductor matrix strength enhanced by finer crystalline grains, and by dispersion strengthened by dispersion of the fine oxide in the matrix. This allows inhibiting a decrease in conductivity to be low, compared with only Sn solid solution-strengthening described in JP-A-6-240426. Thus the fabrication method according to the present preferred embodiment makes it possible to obtain a high-tensile strength copper alloy conductor 18 without causing a substantial decrease in conductivity. Specifically, as will be described later in Embodiments, it is possible to obtain a copper alloy conductor 18 having a high conductivity of 75 to less than 94% IACS and a high strength (tensile strength) of 420 MPa or more required in high-tension overhead wires.

Also, since the fabrication method according to the present preferred embodiment makes it possible to use existing or conventional continuous casting and rolling equipment and cold-processing apparatus, it is possible to make a high conductivity and high strength copper alloy conductor 18 at a low cost without requiring new equipment investment.

Next, another preferred embodiment of the invention will be explained.

The copper alloy conductor 18 according to the previous preferred embodiment comprises a copper parent material 11 containing 0.001 to 0.1 wt % (=10 to 1000 wt·ppm) of oxygen, to which is added 0.15 to 0.70 wt % (exclusive of 0.15 wt %), preferably 0.20 to 0.70 wt %, more preferably 0.30 to 0.60 wt % of Sn 12. This copper alloy conductor 18 has a tensile strength of 420 MPa or more and a conductivity of 60 to less than 94% IACS.

In comparison, a copper alloy conductor according to another preferred embodiment of the invention has more enhanced conductivity. Specifically, the copper alloy conductor according to this embodiment comprises a copper parent material 11 containing 0.001 to 0.1 wt % (=10 to 1000 wt·ppm) of oxygen, to which is added 0.05 to 0.15 wt %, preferably 0.07 to 0.13 wt %, more preferably 0.08 to 0.12 wt % of Sn. This copper alloy conductor comprises crystalline grains whose average diameter is 100 μm or less, which make up crystalline structure, and a Sn oxide, 80% or more of which is dispersed as fine oxide grains with an average diameter of 1 μm or less, in a matrix of the crystalline structure, wherein the tensile strength is 200 to less than 420 MPa, preferably 220 to less than 420 MPa, more preferably 300 to less than 420 MPa, especially preferably 370 to less than 420 MPa, and the conductivity is 94% IACS or more.

Here, the reason is as follows: A Sn content of less than 0.05 wt % cannot make the tensile strength of the copper alloy conductor 18 higher than the tensile strength of pure copper (e.g., tough pitch copper: approximately 220 MPa) even though the fabrication method according to the present preferred embodiment is applied. Also, a Sn content of exceeding 0.15 wt % cannot have the effect of enhancing the conductivity of the copper alloy conductor 94% IACS or more. Furthermore, in the Sn12 content range of 0.05 to 0.15 wt %, the conductivity gradually decreases with increasing Sn content. In the copper alloy conductor according to this embodiment, by adjusting the Sn content in the range of 0.05 to 0.15 wt %, as will be described later in Embodiments, for example, it is possible to adjust the conductivity to 94% IACS or more with the tensile strength of the copper alloy conductor being held as high as 370 to less than 420 MPa.

In the copper alloy conductor according to this embodiment, P and/or B along with Sn may also be added to the copper parent material in the range of not inhibiting a conductivity of 94% IACS or more. The P content is 0.01 wt % (=100 wt·ppm) or less. The B content is 0.01 wt % (=100 wt·ppm) or less. When the P and B both are contained, the P and B contents are 0.02 wt % (=200 wt·ppm) or less in total.

Also, when the oxygen content in the copper parent material is in the range of 0.001 to 0.1 wt % (=10 to 1000 wt·ppm), the more the oxygen content, the higher both the tensile strength and conductivity.

The copper alloy conductor fabrication method according to this embodiment is the same as the copper alloy conductor fabrication method according to the previous embodiment, except that the component composition of the melted copper alloy used in the fabrication is different from that of the melted copper alloy 14 (see FIG. 1) used in the copper alloy conductor fabrication method according to the previous embodiment.

The copper alloy conductor according to this embodiment can have substantially as high a conductivity of 94% IACS or more as that of pure copper, and a high tensile strenth. Specifically, as will be described later in Embodiments, it is possible to obtain a copper alloy conductor having a high conductivity of 94% IACS or more and a high strength (tensile strength) of approximately 400 MPa (i.e., 370 to less than 420 MPa) required in cable conductors for equipment of each kind. The copper alloy conductor according to this embodiment is not only suitable for cable conductors for equipment of each kind, and industrial cable conductors, but also applicable to copper alloy conductors for electric train lines (trolley wires).

Using the copper alloy conductor obtained by the fabrication method according to this embodiment, a single wire rod or stranded wire material is formed, around which is provided an insulating layer, which can result in a high-conductivity and high tensile-strength cable (a wiring material, a power feeding material), such as cables for equipment of each kind, and industrial cables, etc.

The present invention is not limitedto the above-described embodiments, but it is obvious that other variations be supposed.

Next, the present invention will be explained according to embodiments, but is not limited thereto.

Embodiments

Copper alloy conductors (copper alloy conductor wire rods for electric train lines) with a diameter ϕ of 23 mm are fabricated, varying the kind and amount of an additive element added to a copper parent material, final hot-rolling temperature, etc. The copper alloy conductors are fabricated, using the fabrication method according to the present invention.

Specifically, using melted copper alloys, casting is performed at lower temperatures (1100 to 1150° C.) than typical SCR continuous casting temperatures (1120 to 1200° C.), and its mold (copper mold) is forcedly water-cooled. This allows the cast materials to be rapidly cooled up to a lower temperature than the solidification temperatures of the melted copper alloys by 100° C. Next, the cast materials are multistage-hot-rolled with its temperatures adjusted to be lower than a typical hot-rolling temperature in continuous casting and rolling by 50 to 100° C., i.e., 500 to 600° C. Next, the rolled materials are cleaned and reeled to form wire rods 17. The diameters of the reeled wire rods are 23 mm or less. Finally, the reeled wire rods are passed and cold-processed (wire-drawn) at the temperature of approximately 30° C. to make copper alloy conductors.

Embodiments 1 to 3

Copper alloy conductors are fabricated using copper alloy materials in which 0.3, 0.4 and 0.6 wt % of Sn are respectively added to copper parent materials containing 10 wt·ppm of oxygen. The final rolling temperatures are all 560° C.

Embodiments 4 to 6

Copper alloy conductors are fabricated in the similar manner to Embodiments 1 to 3 except that the oxygen content is 350 wt·ppm. The final rolling temperatures are all 560° C.

Embodiments 7 to 9

Copper alloy conductors are fabricated in the similar manner to Embodiments 1 to 3 except that the oxygen content is 500 wt·ppm. The final rolling temperatures are all 560° C.

Embodiment 10

A copper alloy conductor is fabricated using a copper alloy material in which 0.6 wt % of Sn and 0.0050 wt % of P are added to a copper parent material containing 350 wt·ppm of oxygen. The final rolling temperature is 560° C.

Embodiment 11

A copper alloy conductor is fabricated using a copper alloy material in which 0.6 wt % of Sn and 0.0050 wt % of B are added to a copper parent material containing 350 wt·ppm of oxygen. The final rolling temperature is 560° C.

Embodiment 12

A copper alloy conductor is fabricated in the similar manner to Embodiments 1 to 3 except that the Sn content is 0.1 wt %. The final rolling temperature is 560° C.

Embodiment 13

A copper alloy conductor is fabricated in the similar manner to Embodiments 4 to 6 except that the Sn content is 0.1 wt %. The final rolling temperature is 560° C.

Embodiment 14

A copper alloy conductor is fabricated in the similar manner to Embodiments 7 to 9 except that the Sn content is 0.1 wt %. The final rolling temperature is 560° C.

Comparison Example 1

A copper alloy conductor is fabricated in the similar manner to Embodiment 4 except that the final rolling temperature is 650° C.

Comparison Example 2

A copper alloy conductor is fabricated in the similar manner to Embodiment 4 except that the final rolling temperature is 620° C.

Comparison Example 3

A copper alloy conductor is fabricated in the similar manner to Embodiment 1 except that the final rolling temperature is 650° C.

Comparison Example 4

A copper alloy conductor is fabricated in the similar manner to Embodiment 7 except that the final rolling temperature is 650° C.

Table 1 shows the fabrication conditions (oxygen contents, kinds and contents of additives, final rolling temperatures) for copper alloy conductors of Embodiments 1 to 14 and Comparison examples 1 to 4.

TABLE 1

| | O (wt. ppm) | Sn | P | B | Final rolling temperature |
|---|---|---|---|---|---|
| Embodiments | | | | | |
| 1 | 10 | 0.3 | — | — | 560° C. |
| 2 | 10 | 0.4 | — | — | 560° C. |
| 3 | 10 | 0.6 | — | — | 560° C. |
| 4 | 350 | 0.3 | — | — | 560° C. |
| 5 | 350 | 0.4 | — | — | 560° C. |
| 6 | 350 | 0.6 | — | — | 560° C. |
| 7 | 500 | 0.3 | — | — | 560° C. |
| 8 | 500 | 0.4 | — | — | 560° C. |
| 9 | 500 | 0.6 | — | — | 560° C. |
| 10 | 350 | 0.6 | 0.0050 | — | 560° C. |
| 11 | 350 | 0.6 | — | 0.0050 | 560° C. |
| 12 | 10 | 0.1 | — | — | 560° C. |
| 13 | 350 | 0.1 | — | — | 560° C. |
| 14 | 500 | 0.1 | — | — | 560° C. |

TABLE 1-continued

| | O (wt. ppm) | Sn | P | B | Final rolling tempera-ture |
|---|---|---|---|---|---|
| Comparison Examples | | | | | |
| 1 | 350 | 0.3 | — | — | 650° C. |
| 2 | 350 | 0.3 | — | — | 620° C. |
| 3 | 10 | 0.3 | — | — | 650° C. |
| 4 | 500 | 0.3 | — | — | 650° C. |

(unit: wt.%)

Next, trolley wires with a cross-section of 170 $mm^2$ are fabricated using copper alloy conductors of Embodiments 1 to 14 and Comparison examples 1 to 4, respectively. Table 2 shows the tensile strength (MPa), conductivity (% IACS), oxide ratio, crystalline grain size, surface quality, and hot-rolling property of each trolley wire.

Here, with respect to the oxide ratio, the 80% or more ratio of the oxide with an average grain diameter of 1 μm or less is denoted by the "A", and the less than 80% ratio thereof by the "NA".

With respect to the crystalline grain size, the less than 0.5 crystalline grain size is denoted by the "A", and the 0.5 to 1.0 crystalline grain size by the "NA", provided that the average grain diameter of crystalline grans in a trolley wire using the copper alloy conductor of Comparison example 1 is 1.0.

With respect to the surface quality, the surface with few flaws seen after hot-rolling is denoted by the "A", and that with many flaws seen after hot-rolling by the "NA".

With respect to the hot-rolling property, the good hot-rolling property is denoted by the "A", and the poor hot-rolling property by the "NA".

TABLE 2

| | Tensile strength (MPa) | Conductivity (% IACS) | Oxide ratio | Crystalline grain size | Surface quality | Hot-rolling property |
|---|---|---|---|---|---|---|
| Embodiments | | | | | | |
| 1 | 422 | 90 | A | A | A | A |
| 2 | 441 | 85 | A | A | A | A |
| 3 | 450 | 78 | A | A | A | A |
| 4 | 421 | 92 | A | A | A | A |
| 5 | 440 | 87 | A | A | A | A |
| 6 | 448 | 80 | A | A | A | A |
| 7 | 423 | 94 | A | A | A | A |
| 8 | 442 | 89 | A | A | A | A |
| 9 | 449 | 82 | A | A | A | A |
| 10 | 447 | 79 | A | A | A | A |
| 11 | 449 | 80 | A | A | A | A |
| 12 | 390 | 94 | A | A | A | A |
| 13 | 388 | 96 | A | A | A | A |
| 14 | 389 | 99 | A | A | A | A |
| Comparison Examples | | | | | | |
| 1 | 410 | 88 | NA | NA | A | A |
| 2 | 415 | 89 | NA | NA | A | A |
| 3 | 416 | 80 | NA | NA | A | A |
| 4 | 417 | 92 | NA | NA | A | A |

As shown in Table 2, the trolley wires respectively fabricated using the copper alloy conductors of Embodiments 1 to 11 all have a tensile strength of 420 MPa or more (421 to 450 MPa) and a conductivity of less than 94% IACS (78 to 94% IACS).

On the other hand, the trolley wires respectively fabricated using the copper alloy conductors of Embodiments 12 to 14 all have a tensile strength of less than 420 MPa (388 to 390 MPa) and a conductivity of 94% IACS or more (94 to 99% IACS).

Here, each trolley wire has a 80% or more ratio of the oxide with an average grain diameter of 1 μm or less, wherein subgrain boundaries are observed in the crystalline grains, and the sizes of the crystalline grains are less than 0.5. Further, each trolley wire has few surface flaws, and is therefore good in surface quality and hot-rolling property.

Also, from the results of comparing the trolley wires respectively fabricated using the copper alloy conductors of Embodiments 1 to 3, 4 to 6, and 7 to 9, it is found that, with increasing Sn content, the tensile strength enhances, but the conductivity decreases. From the results of comparing the trolley wires respectively fabricated using the copper alloy conductors of Embodiments 6 and 10, Embodiment 10 with P added therein exhibits better surface quality. From the results of comparing the trolley wires respectively fabricated using the copper alloy conductors of Embodiments 6 and 11, Embodiment 11 with B added therein exhibits slightly higher tensile strength.

In contrast, the trolley wires respectively fabricated using the copper alloy conductors of Comparison examples 1, 3, and 4 all have oxygen and Sn contents of the copper parent materials which are both within prescribed ranges. However, because the final rolling temperature is outside the prescribed range of 500 to 600° C., these trolley wires have a small fine-oxide ratio, and a large crystalline grain size. Specifically, the conductivities are 80 to 92% IACS, which all satisfy the prescribed range of 75% IACS or more, but the tensile strengths are 410 to 417 MPa, which all are less than 420 MPa, which cannot satisfy the prescribed range of 420 MPa or more.

Also, the trolley wire respectively fabricated using the copper alloy conductor of Comparison example 2 has oxygen and Sn contents of the copper parent material which are both within prescribed ranges. However, because the final rolling temperature is outside the prescribed range of 500 to 600° C., this trolley wire has a small fine-oxide ratio, and a large crystalline grain size. Specifically, the conductivity is 89%

IACS, which satisfies theprescribed range of 75% IACS or more, but the tensile strength is 415 MPa, which cannot satisfy the prescribed range of 420 MPa or more.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A Cu—Sn alloy conductor, comprising:
- a Cu—Sn alloy material consisting of copper, 0.001 to 0.1 wt % of oxygen, 0.15 to 0.70 wt % (exclusive of 0.15 wt %) of Sn, and inevitable impurities,
- wherein a crystalline grain to form a crystalline structure of the Cu—Sn alloy material has an average diameter of 100 μm or less, and sub-boundaries are formed in the crystalline grain,
- wherein an oxide of the Sn is crystallized or precipitated in a matrix of the crystalline structure,
- wherein 80% or more of the oxide of the Sn is dispersed in the matrix of the crystalline structure as a fine oxide grain with an average diameter of 1 um or less,
- wherein a cross-sectional area of the Cu—Sn alloy conductor is in a range from 110 $mm^2$ to 170 $mm^2$,
- wherein a tensile strength of the Cu—Sn alloy conductor having the cross-sectional area is 420 MPa or more, and
- wherein a conductivity of the Cu—Sn alloy conductor having the cross-sectional area is 60% IACS or more.

2. The Cu—Sn alloy conductor according to claim 1, wherein a conductivity is in a range from 75% IACS to less than 94% IACS.

3. The Cu—Sn alloy conductor according to claim 1, wherein the copper alloy material comprises 0.3 to 0.6 wt % of the oxide of the Sn.

4. The Cu—Sn alloy conductor according to claim 3, wherein the 80% or more of the oxide of the Sn is dispersed in the matrix of the crystalline structure as the fine oxide grain with an average diameter of 0.5 μm or less.

5. The Cu—Sn alloy conductor according to claim 4, wherein the copper parent material comprises 0.035 to 0.1 wt % of oxygen.

6. The Cu—Sn alloy conductor according to claim 1, wherein the 80% or more of the oxide of the Sn is dispersed in the matrix of the crystalline structure as fine oxide grain with an average diameter of 0.5 μm or less.

7. The Cu—Sn alloy conductor according to claim 1, wherein the copper parent material comprises 0.035 to 0.1 wt % of oxygen.

8. The Cu—Sn alloy conductor according to claim 1, wherein the oxide of the Sn is crystallized and fragmented in the matrix of the crystalline structure.

9. A trolley wire, comprising:
- a Cu—Sn alloy conductor that comprises a Cu—Sn alloy material consisting of copper, 0.001 to 0.1 wt % of oxygen, 0.15 to 0.70 wt % (exclusive of 0.15 wt %) of Sn, and inevitable impurities,
- wherein a crystalline grain to form a crystalline structure of the Cu—Sn alloy material has an average diameter of 100 μm or less, and sub-boundaries are formed in the crystalline grain,
- wherein an oxide of the Sn is crystallized or precipitated in a matrix of the crystalline structure,
- wherein 80% or more of the oxide of the Sn is dispersed in the matrix of the crystalline structure as a fine oxide grain with an average diameter of 1 um or less,
- wherein a cross-sectional area of the Cu—Sn alloy conductor is in a range from 110 $mm^2$ to 170 $mm^2$,
- wherein a tensile strength of the Cu—Sn alloy conductor having the cross-sectional area is 420 MPa or more, and
- wherein a conductivity of the Cu—Sn alloy conductor having the cross-sectional area is 60% IACS or more.

* * * * *